United States Patent [19]

Saito

[11] 4,454,976
[45] Jun. 19, 1984

[54] ENDLESS TYPE TAPE CASSETTE

[75] Inventor: Kenzo Saito, Izumi, Japan

[73] Assignee: Sony Corporation, Tokyo, Japan

[21] Appl. No.: 256,056

[22] Filed: Apr. 21, 1981

[30] Foreign Application Priority Data

Apr. 25, 1980 [JP] Japan .............................. 55-55877[U]
Sep. 10, 1980 [JP] Japan ............................ 55-128619[U]

[51] Int. Cl.³ ..................... B65H 17/42; B65H 17/50; G11B 15/56
[52] U.S. Cl. .................................... 226/118; 226/195; 242/55.19 A
[58] Field of Search .................. 226/59, 97, 117, 118, 226/195; 242/55.19 R, 55.19 A

[56] References Cited

U.S. PATENT DOCUMENTS 3,608,805  9/1971  Ogata ................................... 226/118
3,618,841 11/1971  Browning ........................... 226/195
3,929,298 12/1975  Hara et al. ................... 242/55.19 R
3,966,107  6/1976  Constantini et al. .................. 226/59
4,128,198 12/1978  Woodley ............................... 226/97

Primary Examiner—Leonard D. Christian
Attorney, Agent, or Firm—Hill, Van Santen, Steadman & Simpson

[57] ABSTRACT

A tape cassette is so arranged that an endless tape, stored in a tape accumulating portion in a cassette body, to which a front lid is pivotally movably secured, to thereby assume an open position and a closed position with respect to a front opening in the cassette, and pulled out of the cassette body, is again drawn into the cassette body, by means of a tape drawing reel mounted in a position displaced to one side from the center of the cassette body. A pair of elastic members are disposed in an elastically contracting relation to each other, with the free ends thereof facing a tape discharge gate within the cassette body, so that the endless tape can pass through the pair of elastic members. The tape cassette further includes a rotatably mounted, reverse rotation check member; and a flexible member attached at one end or in the intermediate portion thereof to the cassette body, with the other end maintained in pressure-contact with an elastic member surrounding the flank portion of the tape drawing reel. The flexible member is slidably connected in a portion between the fixed portion and the aforesaid other end to the reverse rotation check member. When the tape drawing reel is rotated in a reverse direction, the aforesaid other end portion of the flexible member is strongly pressed against the elastic member while being deformed, thereby pressing the reverse rotation check member against the tape drawing reel thereby impeding reverse rotation thereof.

19 Claims, 15 Drawing Figures

FIG. I
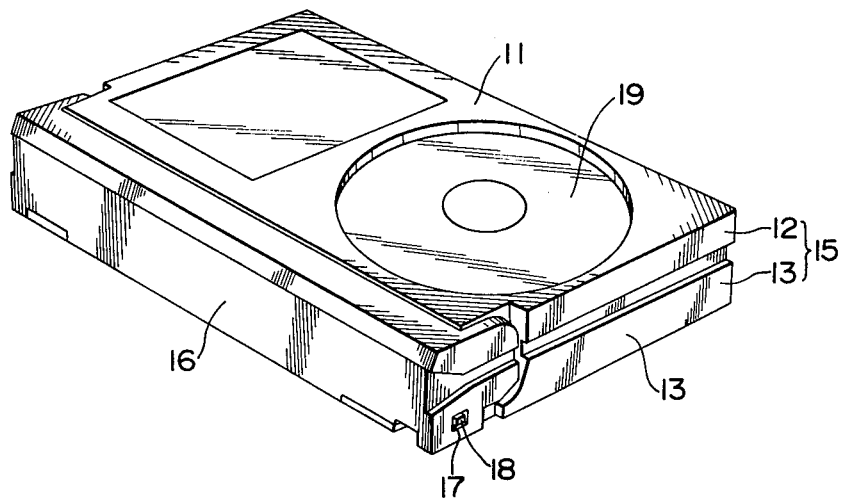
FIG. 2
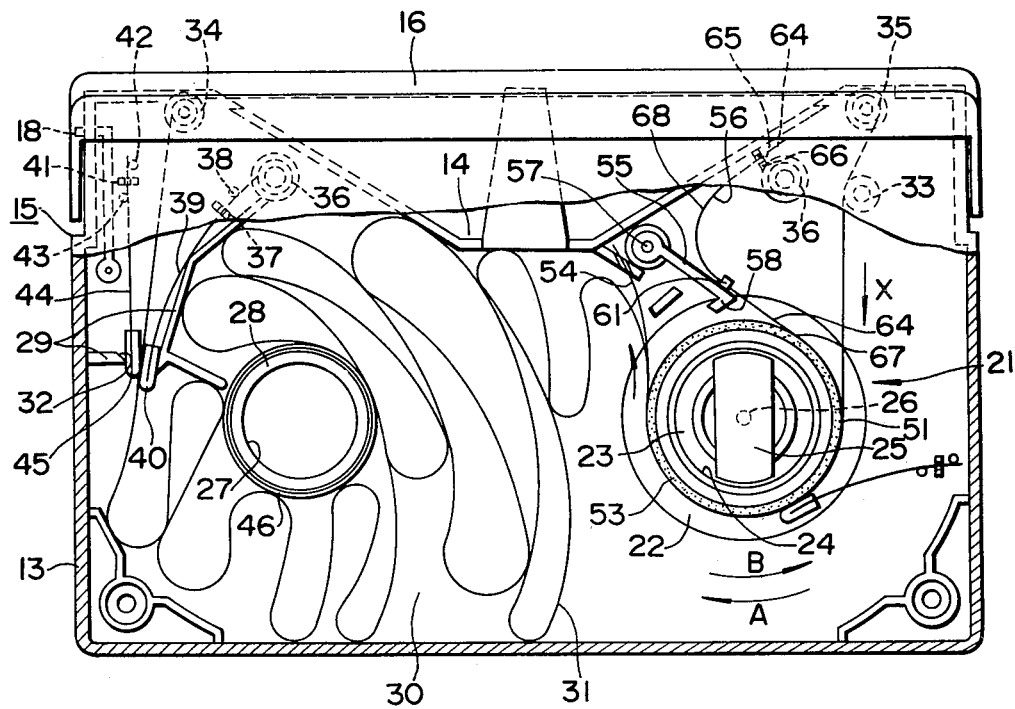

ENDLESS TYPE TAPE CASSETTE

BACKGROUND OF THE INVENTION

This invention relates to an endless type tape cassette, wherein an endless tape serving as a recording medium is lodged in a meandering fashion in a cassette, and the tape pulled out of the cassette is again drawn into the cassette by means of a tape drawing reel.

Where recorded video signals for a comparatively short length are repeatedly reproduced by means of a magnetic recording and reproducing device, such as a video tape recorder, an endless tape cassette is generally used.

A conventional tape cassette of the type has been such that an endless magnetic tape is contained in a meandering fashion in a tape housing provided in a cassette body; the endless magnetic tape is successively drawn out of the cassette body, for reproduction; and the magnetic tape is pressed, by means of a press member, against the flank portion of a tape drawing reel, to which is wound a friction member made of rubber, to thereby be drawn into the cassette body. More in detail, the magnetic tape is pulled out of the tape housing to the exterior, via a tape discharge gate provided by cutting part of the partition wall of the tape housing, a narrow gap defined by a friction guide pin provided upright in the vicinity of the tape discharge gate and an elastic plate maintained in pressure-contact with the friction guide pin, thence via guide pins, and through an opening provided in the cassette body. The magnetic tape is then drawn into the cassette body with the aid of the frictional force of the magnetic tape relative to a friction member, via guide pins and a guide roller, as the tape drawing reel is rotated in the normal direction. The magnetic tape led into the cassette body, is separated from the flank portion of the tape drawing reel by means of a separation member made of synthetic resin, such as a myler film, so that the magnetic tape no longer clings to the flank portion of the reel.

Generally in the tape cassette of the tape, a reverse rotation check lever for preventing the drawing reel from rotating in a reverse direction is rotatably mounted on a support shaft. The reverse rotation check lever is combined with the separation member. A strip of tape guide member is attached to the rib of the cassette body, in a manner that the end of the tape guide member softly presses the free end of the separation member against the flank of the tape drawing reel.

When the tape drawing reel is rotated in a reverse direction, the separation member is pulled toward the flank portion of the reel by the frictional force of the separation member relative to the frictional member, whereas the reverse rotation check lever is pivotally moved about the shaft in a direction to be pressed on the flank portion of the reel. The bent end portion of the reverse rotation check lever is brought into engagement with the friction member, thereby impeding the reverse rotation of the drawing reel.

In the tape cassette, the magnetic tape pulled out of the tape housing is biased to one direction under the resiliency of the elastic strip member adapted to pressure-contact the frictional guide pin. Owing to an adequate frictional resistance is produced between the smoothing member provided at the end of the elastic strip and the magnetic tape, the magnetic tape is thus led out to the exterior in a constant tension. In this connection, the tape discharge gate must be comparatively narrow, so as to prevent the passing therethrough, of two or more runs of tape contained in a meandering fashion in the tape housing at a time. The permissible gap is, for example, on the order of 0.5 mm at the utmost, from the viewpoint of accuracy and ease of assembly.

With the conventional tape cassette of the tape, there has been encountered a problem that two or more runs of magnetic tape contained in a meandering fashion in the tape housing are liable to cling to each other under the electrostatic action, with a likelihood of being carried into the tape discharge gate. As a result, the magnetic surface of the magnetic tape is broken or two or more runs of magnetic tape clung to each other can not pass through the tape discharge gate in the worst case. Because of a difference between the frictional resistance of the magnetic tape relative to the friction guide pin and the frictional resistance of the magnetic tape surface relative to the smoothing members, the magnetic tape and the resilient strip member are liable to vibrate. The unstable travelling of the magnetic tape, result, impairing the quality of a reproduced image. Further, through the cyclical use of the tape, dust is stuck to the peripheral surface of the friction member secured to the flank portion of the tape drawing reel, or a magnetic powder falls off the magnetic layer of the magnetic tape, to be stuck to the peripheral surface of the friction member. The frictional force between the friction member and the separation member is thus impaired, with the failure to operate the reverse rotation check lever, in case of rotation in a reverse direction, of the tape drawing reel. When the endless tape cassette is removed from the video tape recorder body, the tape drawing reel is displaced from the support shaft to a portion remote therefrom, and the pressure-contact force of the separation member relative to the friction member is reduced to the lowest. In the event that the tape drawing reel is accidentally rotated in a reverse direction under such situation, rotation in the reverse direction, of the tape drawing reel can not be stopped because of the lowered frictional force between the separation member and the friction member. Unless the reverse rotation check lever is operated in the usual manner, the magnetic tape undesirably gets into the interstices between the friction member and the separation member when the tape drawing reel is rotated in a reversed direction. The magnetic tape would be broken, and in the worst case, the magnetic tape, and hence the tape cassette itself become futile.

The above-described inconveniences can be overcome by forming the separation member of a material having a large coefficient of elasticity and by strongly pressing the separation member against the friction member of the tape drawing reel. This arrangement is effective to prevent rotation in the reverse direction, of the tape drawing reel, but attended with another drawback. If the separation member is strongly pressed against the outer peripheral surface of the friction member, the pressure-contact force of the separation member acts as a braking force (a load torque) against the reel driving froce. Because of such a braking force, rotation in the normal direction, of the tape drawing reel becomes irregular when the magnetic tape is led into the cassette body, and the rotating speed of the reel becomes slow, leading to the slackening of the magnetic tape. The automatic stopping device in the video tape recorder body, in such a case, is operated, to stop the magnetic tape.

SUMMARY OF THE INVENTION

It is accordingly an object of the present invention to provide a tape cassette, wherein the stable travel of a magnetic tape is ensured.

It is another object of the present invention to provide a tape cassette, wherein a tape travels, without a risk of being broken.

It is a further object of the present invention to provide a tape cassette, wherein the lowering of a reproducing characteristic, which would accrue from the unstable travel of a magnetic tape, is avoided.

It is a still further object of the present invention to provide a tape cassette, wherein there is no risk that a magnetic tape is clung to a tape drawing reel or a tape guide provided in a cassette body.

It is a still further object of the present invention to provide a tape cassette, wherein a magnetic tape is contained in a meandering fashion in a tape housing in a cassette body in a state that two or more runs of the magnetic tape are clung to each other, and these two or more runs of magnetic tape are separated from one another, so that only a single run of magnetic tape may be led out to the exterior of the cassette body at a time.

It is a still further object of the present invention to provide a tape cassette, wherein a pair of tape pressing members are disposed in an elastically contacting relation to each other, with one ends thereof facing a tape discharge gate, so as to prevent two or more runs of magnetic tape from passing through the tape discharge gate at a time.

It is a still further object of the present invention to provide a tape cassette, wherein rotation, in a reverse direction, of a tape drawing reel is prevented, the tape drawing reel being so arranged as to lead into the cassette the tape once pulled out to the exterior thereof.

It is a still further object of the present invention to provide a tape cassette, which ensures smooth rotation of a tape drawing reel.

It is a still further object of the present invention to provide a tape cassette, wherein a flexible member for driving a reverse rotation check member softly presses an elastic member surrounding the flank portion of a tape drawing reel, with the assurance of the pivotal movement of the reverse rotation check member, so as to impede a reverse rotation of the tape drawing reel under any condition, for example, if dust is stuck to the elastic member.

It is a still further object of the present invention to provide a tape cassette, wherein a pressure of a flexible member for driving a reverse rotation check lever which acts on an elastic member surrounding the flank of a tape drawing reel is greatly reduced, thereby reducing a braking force (a load torque) to be exerted on the tape drawing reel when rotated in the normal direction.

It is a still further object of the present invention to provide a tape cassette, wherein when a tape drawing reel is rotated in a reverse direction, a tape has no likelihood of slackening within the cassette body.

It is a still further object of the present invention to provide a tape cassette, wherein a member for preventing a tape from being slacken and a flexible member for driving a reverse rotation check lever are formed integrally, for curtailing a manufacturing cost.

These and other objects and features of the present invention will be apparent from the ensuing part of the specification in conjunction with the drawings which indicate preferred embodiments of the invention.

BRIEF DESCRIPTION OF THE DRAWINGS

FIG. 1 is a perspective view of an external appearance of a tape cassette;

FIG. 2 is a plan view, partly broken away, of a tape cassette body;

DESCRIPTION OF THE PREFERRED EMBODIMENTS

Figure 3A:
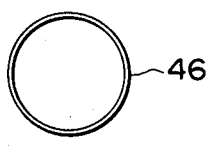
FIG. 3(A) is a plan view of a cover for preventing the clinging of a magnetic tape to a tape drawing reel.

An endless type tape cassette 11 comprises a cassette body 15 consisting of an upper half case 12 and a lower half case 13, which are mated with each other and made of synthetic resin, and having a front opening, 14, and a front lid 16 pivotally movably secured to the cassette body to assume open and close positions with respect to the front opening 14. The front lid 16 is turned to a close position by fitting stopper pins 18 into holes 17 provided in both side walls of the lid, which stopper pins are provided on the side walls of the lower half case 13, and turned to an open position by pressing the stopper pins 18 toward the lower half case 13. There is provided in the top surface of the cassette body 15 a window 19 for a magnetic tape, into which a transparent disc is fitted. A tape drawing reel 21 (hereinafter referred to as a reel) made of, for example, synthetic resin, is rotatably mounted in a portion displaced to one side of the cassette body 15, as seen in FIG. 2. The reel 21 comprises a diametrically small flange 22 and a reel hub 23. The reel 21 is elastically supported within the cassette body 15 by rotatably fitting the lower base portion of the reel into a through-hole provided in the lower half case 13 and by pressing the top end of the reel by means of a holding projection 26 pendent from the top inner wall of the upper half case 12 through the medium of a leaf spring 25 fitted into a recess 24 provided in the top end face of the reel.

A tubular guide 28 having a through-hole 27, into which a support shaft provided in a video tape recorder is to be fitted, and a partition wall 29 are formed integrally in the left part (in FIG. 2) of the cassette body 15. A space defined by the partition wall 29 and the reel 21 is used as a tape accumulating portion 30. An endless magnetic tape 31 (hereinafter referred to as an endless tape) is contained in an irregularly meandering fashion or folded fashion in the tape accumulating portion 30, thus forming multiple runs. The endless tape 31 is pulled out to the front left portion of the cassette body 15 through a tape discharge gate 32 provided by cutting part of the partition wall 29. The endless tape 31 then travels by way of tape guides 33, 34 and 35 provided in the left and right parts of the cassette body 15, and by way of the front end portion of the cassette, and eventually is trained about the reel 21.

The opposing walls of the tape discharge gate 32 formed by cutting part of the partition wall 29 are of a knife edge shape. In the vicinity of attaching boss 36, into which a screw is fitted, for mating the upper half case 12 and the lower half case 13 with each other, there are provided positioning pins 37 and a support pin 38 in the manner shown in FIG. 2. An elongated strip of elastic plate 39 is retained at one end thereof by the support pin 38 and the attaching boss 36, and partly loosely fitted between the positioning pins 37, with its free end facing the tape discharge gate 32.

Figure 3B:
FIG. 3(B) is a side elevational view of the cover of FIG. 3(A)

At least the free end portion of the strip of elastic plate 39 is covered with a tape holding piece 40 made of a low friction material having a small coefficient of friction, such as a high molecular film containing carbon. On the other hand, a positioning pin 41 and two support pins 42 and 43 are provided at a given spacing from each other in the vicinity of the stopper pin 18 on the lower half case 13. Another elongated strip of elastic plate 44 is partly loosely fitted on the positioning pin 41, and retained by means of the support pins 42 and 43, with its free end facing the tape discharge gate 32. The free end portion of the strip of elastic plate 44 is covered with a tape holding piece 45. These strips of elastic plate 39 and 44 are elastically supported in an elastically contacting relation and in an opposing relation to each other. The width of the tape discharge gate 32 is made slightly larger than the sum in thickness of the tape holding pieces 40 and 45, as measured when placed in the side-by-side relation to each other. The endless tape 31 is pulled out in a given tension to the exterior of the cassette body 15, while being elastically held between the tape holding pieces 40 and 45 and given a proper frictional resistance. A tubular cover 46 for preventing the clinging of the tape to the tubular guide 28 is rotatably fitted on the tubular guide 28. The tubular cover 46 is made of a sheet material, such as a high molecular film containing carbon, and has a thickness in the range of 0.1 to 0.2 mm, as best seen in FIGS. 3(A) and 3(B). By fitting the tubular cover 46 on the tubular guide 28, the endless tape 31 is allowed to travel smoothly, without being clung to the tubular guide 28.

Figure 4A:
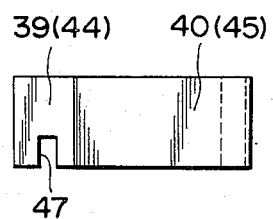
FIG. 4(A) is a side elevational view of a tape holding member.
Figure 4B:
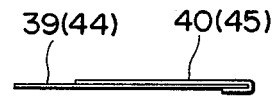
FIG. 4(B) is a plan view of the tape holding member.
Figure 5:
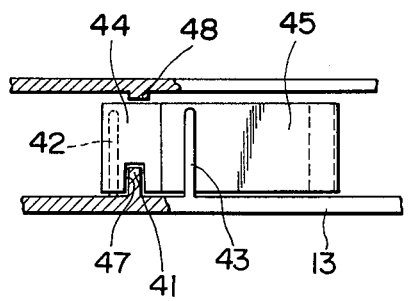
FIG. 5 is a side elevational view of the tape holding member attached to the tape cassette.

Referring to the strips of elastic plate 39 and 44, whose free ends face the tape discharge gate 32, respective strips of elastic plate 39 and 44 are provided with cuts 47 at the lower longitudinal edge in one end portions thereof, respectively. The other end portions of respective strips of elastic plate 39 and 44 are covered with the tape holding pieces 40 and 45, as described above. The tape holding piece 40 and 45 may cover more than half the over-all length of the strip of elastic plate 39 and 44, as shown in FIGS. 4(A) and 4(B). The strip of elastic plate 44 is supported by support pins 42 and 43, on the both sides thereof, while the cut 47 provided in one end portion of the strip receives the positioning pin 41 provided on the lower half case 13, as seen in FIG. 5(A). The upper longitudinal edge of the strip of elastic plate 44, which opposes the cut 47, is softly pressed by a pin 48 projecting from the top inner wall of the upper half case 12, which is to be mated with the lower half case 13, whereby the vertical position of the strip of elastic plate 44 is regulated. Another strip of elastic plate 39 is held in place in like manner in the cassette body 15, which consists of the upper and lower half cases 12 and 13. The endless tape is thus given a predetermined tension.

The strips of elastic plate 139 and 144 (FIGS. 6 and 7) whose free ends face the tape discharge gate 32 respectively have a different length, so that the free end of one strip of elastic plate 139 may project toward the tape accumulating portion 30, as compared with the free end of the other strip 144. In the case where the tape holding piece 140 attached to the free end of one strip of elastic plate 139 projects toward the tape accumulating portion, as compared with the tape holding piece 145 attached to the other strip 144, two runs of tape clung to each other, as shown by a solid line in FIG. 6, are separated from each other by means of the tape holding piece 140 as shown by a dotted line in FIG. 6, so that there is avoided the passing of two or more runs of tape through the tape holding pieces 140 and 145 at a time.

Figures 6, 7, 8:
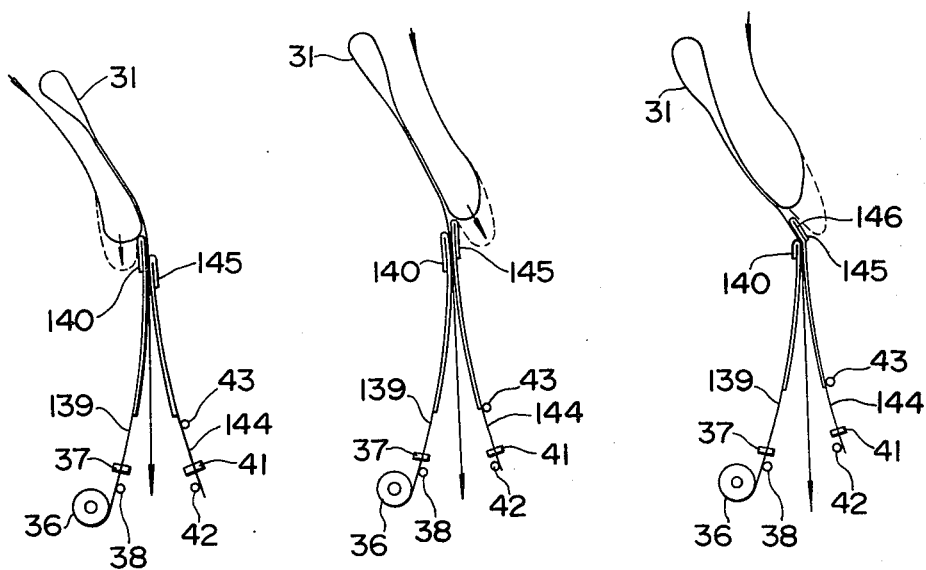
FIG. 6 is a plan view, showing another mode of attachment of the tape holding members to strips of elastic material.
FIG. 7 is a plan view of a further mode of attachment of the tape holding members to the strips of elastic material.
FIG. 8 is a plan view of a still further mode of attachment of the tape holding members to the strips of elastic material.

In the case where the tape holding piece 145 attached to the free end of the other strip of elastic plate 144 projects toward the tape accumulating portion 30, as compared with the tape holding piece 140 attached to the one strip of elastic plate 139, two runs of tape clung to each other on the right side of the tape holding piece 145 are separated from each other by means of the other tape holding piece 145 as shown by a dotted line in FIG. 7, so that only a single run of endless tape 31 can successively pass through the tape holding pieces 140 and 145. In the case where the tape holding piece 145 attached to the one end of other strip of elastic plate 144 projects to the tape accumulating portion 30, as compared with the tape holding piece 140 of the one strip of elastic plate 139, and the end of the tape holding piece 145 is tilted toward the tubular guide 28, as shown in FIG. 8, two or more runs of endless tape clung to each other are separated from each other, as shown by a dotted line in FIG. 8, so that two or more runs of endless tape by no means pass through the tape holding pieces at a time.

A tubular rubber member 51 surrounds the flank portion of the tape drawing reel 21, and part of the endless tape 31 is pressed against the peripheral surface 53 of the tubular rubber member 51 by a pass member 52. A separation plate 54 is pressed against part of the peripheral surface of the tubular rubber member 51 on the downstream of the press member 52, as viewed in the direction of rotation in the normal direction, of the reel 21 (in the direction of arrow A in FIG. 2). The tape press member 52 and the separation plate 54 are made of a film of synthetic resin, such as a mylar film, and have a proper elasticity. These two members are mechanically attached to or attached by a bonding agent to the cassette body 15, as shown in FIG. 2.

As the reel 21 is rotated in the normal direction (in the direction of arrow A in FIG. 2), the endless tape 31 is led into the cassette body 15 from the direction of arrow X in FIG. 2 by a frictional force generated between the tubular rubber member 51 and the endless tape. The endless tape 31 led into the cassette body 15 is diverted from the peripheral surface 53 of the tubular rubber member 51 by the separation plete 54 to be transported in the direction of arrow Y, so as to be stored in the tape accumulating portion 30.

Figure 9:
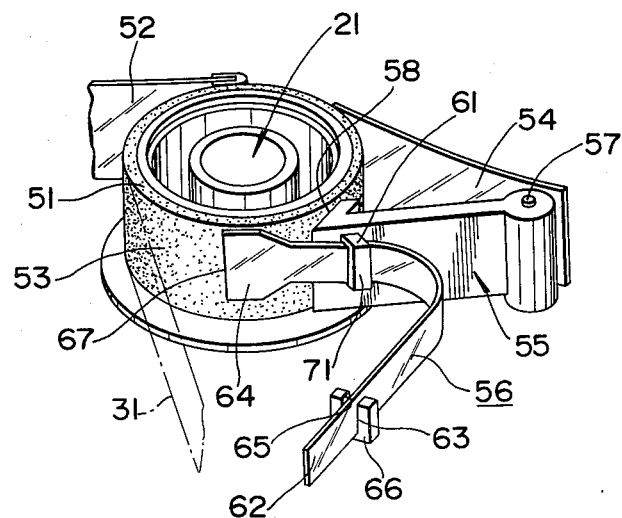
FIG. 9 is an enlarged perspective view of a portion associated with a tape drawing reel.
Figure 10:
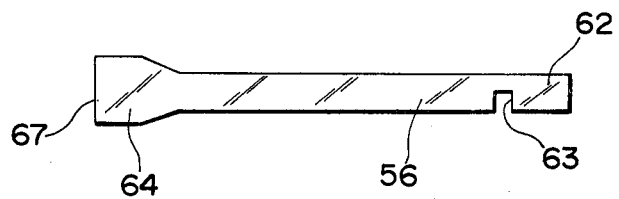
FIG. 10 is a plan view of a flexible member for driving the reverse rotation check lever.

There are provided a reverse rotation check lever 55 for preventing the reel 21 from being rotated in a reverse direction (in the direction of arrow B in FIG. 2), and a flexible member 56 for causing the lever 55 to pivotally move in a given direction when the reel 21 is rotated in a reverse direction. The reverse rotation check lever 55 is of an elongated plate, and is pivotally movably supported at one end by a support shaft 57, which in turn is formed integrally with the cassette body 15, as shown in FIGS. 2 and 9. The lever 55 is bent at an acute angle as at 58 at the other end thereof. An L-shaped attaching piece 61 is formed integrally with the lever 55 on the back of the bent end portion 58 of the lever.

The lever-driving, flexible member 56 is made of an elongated film of synthetic resin, such as a mylar film, and has flexibility. The flexible member 56 is provided with a positioning recess 63 in one end portion thereof and enlarged in width in the other end portion thereof.

A support piece 66 having a recess 65 is formed integrally with the cassette body 15. One end portion of the flexible member 56 is inserted in the recess 65 in the support piece 66, and on the other hand, part of the support piece 66 is fitted into the recess 63 in the flexible member 56. The flexible member 56 is held in place by fitting a pair of projections (not shown) provided on the top inner wall of the upper half case 13 into the recess 63. The lever-driving, flexible member 56 is thus retained in place by the support piece 66. The flexible member 56, as seen in FIGS. 2 and 9, is curved from the stationary portion locked by the support piece 66 to the other end with a large width, thus presenting an arcuate shape or the form of bay as a whole. The end 67 of the aforesaid other end with a large width 64 of the flexible member is maintained in pressure-contact and engagement with the peripheral surface 53 of the tubular rubber member 51 of the reel 21 by the elastic restoring force. The intermediate portion between the portion which is the largest in curvature and the large-width end portion, of the flexible member is inserted into a gap between the side surface of the reverse rotation check lever 55 and a pendent portion 71 of the attaching piece 61, whereby the flexible member 56 and the reverse rotation check lever 55 are slidably connected with each other. When the reel 21 is stopped or rotated in the normal direction A (in FIG. 2), there is formed a spacing in the range of 2 to 3 mm between the bent end 58 of the reverse rotation check lever 55 and the peripheral surface 53 of the tubular rubber member 51 fitted on the flank of the reel 21, so that the reel 21 can rotate in a non-contacting relation to the reverse rotation check lever 55.

The operations of the reverse rotation check lever 55 and the lever-driving, flexible member 56 will be described hereunder.

Figure 11:
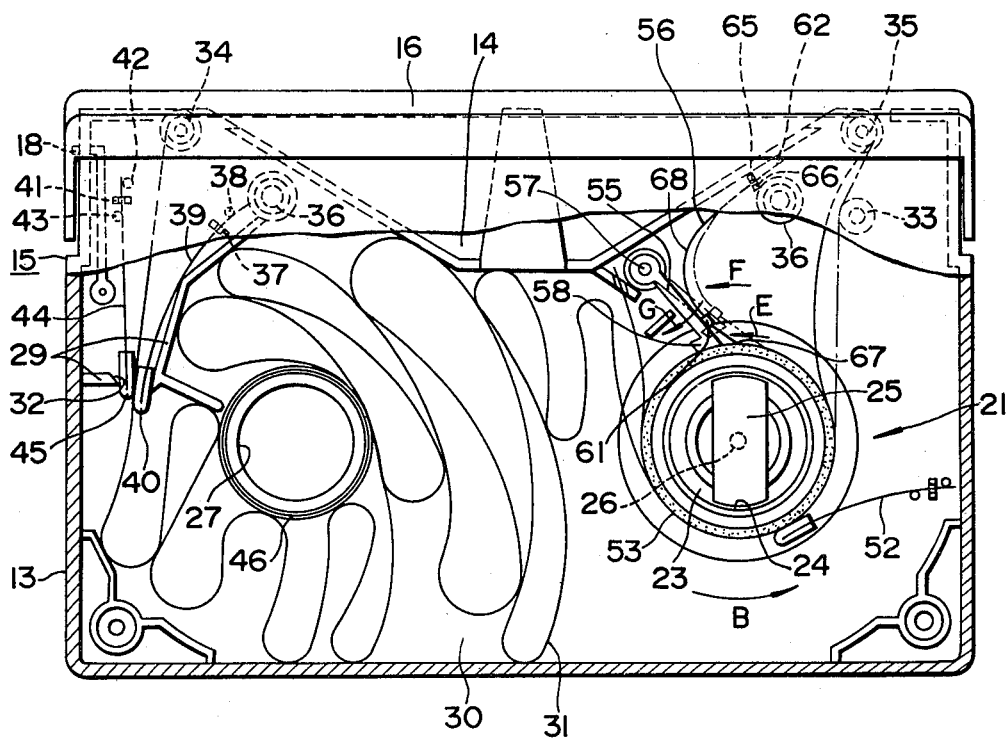
FIG. 11 is a plan view, partly broken away, of the tape cassette, illustrating operations of the reverse rotation check lever and the flexible member when the tape drawing reel is rotated in a reverse direction.

When the reel 21 is rotated in the reverse direction B in FIG. 11 by a finger or a bar inserted into a reelshaft inserting hole (not shown) provided in the bottom wall of the reel 21, then the end 67 of the flexible member 56 is biased in the direction of arrow E in FIG. 11 by the frictional force generated between the aforesaid end and the peripheral surface of the tubular rubber member 51. In this case, the end 67 of the flexible member 56 is strongly pressed against the peripheral surface of the tubular rubber member 51, as the tubular rubber member 51 is rotated in the reverse direction. The flexible member 56 is displaced in the direction of arrow E when the reel 21 is rotated in the reverse direction.

Thereafter, the flexible member 56 is displaced from the position shown by a phantom line in FIG. 11 toward the direction of arrow F, while being deformed. With the progress of this movement, the back surface of the reverse rotation check lever 55 is pressed by the flexible member 56, so that the check lever 55 is so loaded as to pivotally move slidingly in the direction of arrow G about the support shaft 57. As a result, the bent portion 58 of the reverse rotation check lever 55 is brought into pressure-contact and engagement with the peripheral surface of the tubular rubber member 51, thereby impeding the rotation in the reverse direction, of the reel 21.

The flexible member 56 is displaced, with the end 67 thereof maintained in strong contact with the peripheral surface 53 of the tubular rubber member 51 as described above. Although the pressure of the other end portion 64 of the flexible member 56 against the tubular rubber member 51 is comparatively low, and the contacting area of the other end with the tubular rubber member is reduced to ½ or ⅓ of that of the conventional one, the above-described arrangement ensures displacement in the direction of arrow F, of the flexible member 56 when the reel 21 is rotated in the reverse direction.

When the reel 21 is rotated in the normal direction, i.e., in the direction of arrow A under the conditions shown by a solid line in FIG. 11, the end 67 of the flexible member is biased in a direction opposite the E-direction from the peripheral surface 53 of the tubular rubber member 51, whereby the flexible member 56 and the reverse rotation check lever 55 are displaced to a position shown by a phantom line in FIG. 11. The engagement of the bent end portion of the reverse rotation check lever 53 with the peripheral surface of the tubular rubber member 51 is released, thus allowing the reel 21 to rotate in the normal direction.

In the endless tape cassette so far described, the frictional force developed between the peripheral surface 53 of the tubular rubber member 51 and the end 67 of the flexible member 56 when the reel 21 is rotated in the normal direction acts as a braking force on the reel 21 (a load torque). In this connection, the pressure of the flexible member 56 on the tubular rubber member 51 need not be strong in this embodiment, as described above, and the braking force is nearly insignificant for the driving force for the reel 21. The fact that the flexible member 56 is maintained in pressure-contact with the tubular rubber member 51 fitted on the reel 21 does not adversely affect on the reel 21. The smooth and stable rotation of the reel 21 is thus ensured. Owing to the arrangement in which the reverse rotation check lever 55 and the lever-driving, flexible member 56 are slidably connected to each other, the flexible member 56 is surely displaced when the reel 21 is rotated in the reverse direction. By this arrangement, response of the reverse rotation check lever 55 to occurance of rotation in a reverse direction, of the reel 21 is promoted, with the result that reliability in performance of the reverse rotation check lever 55 for impeding rotation in the reverse direction of the reel is greatly enhanced.

Figure 12:
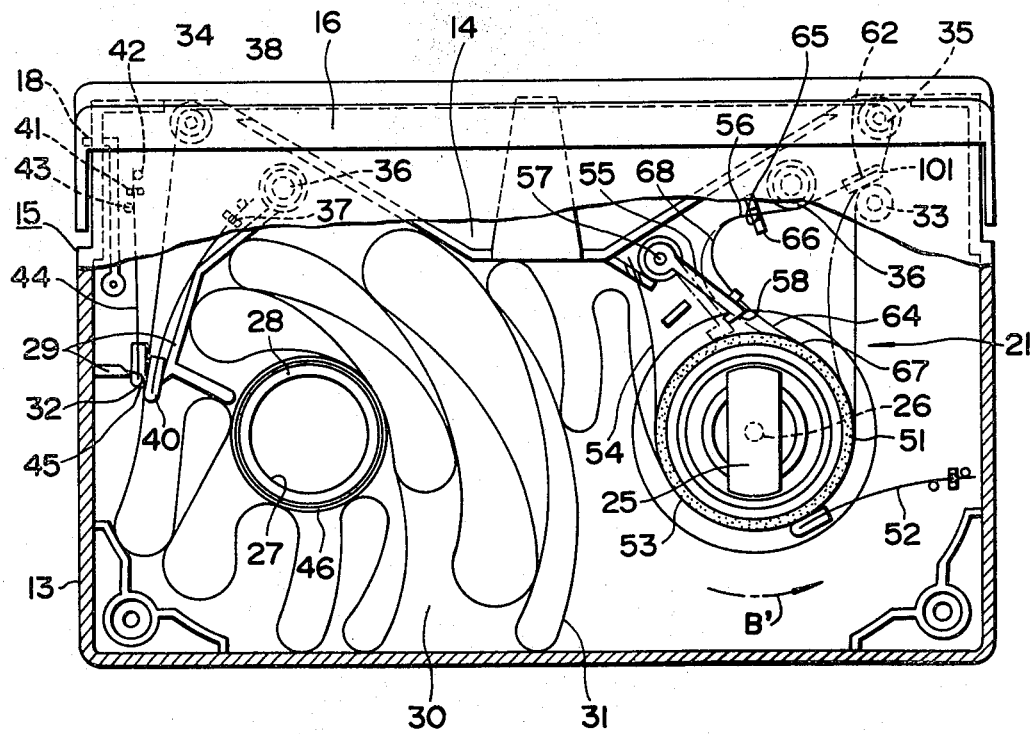
FIG. 12 is a plan view, partly broken away, of a tape cassette according to another embodiment of the present invention.
Figure 13:
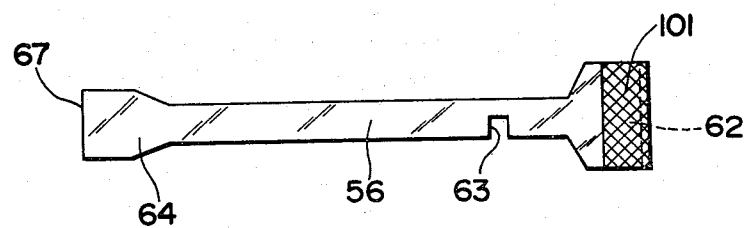
FIG. 13 is a plan view of the flexible member in the modified form.

FIGS. 12 and 13 shown a further embodiment of the present invention. Components common to those in the first embodiment are denoted by like reference numerals, with no further description given thereto. One end portion 62 of the flexible member 56 is increased in width as well as length, and a tape holding piece 101 is attached to the one end with a large width, so that the endless tape 31 may be pressed against the tape guide 33 by the tape pressing piece 101. The tape pressing piece 101 is made of a low friction material having a small coefficient of friction, such as a super high molecular film containing carbon and attached by a bonding agent to the one end with a large width, of the flexible member 56, as best seen in FIG. 13. The flexible member 56 is curved to some extent by a post 36 between the support piece 66 and the tape guide 33. The tape pressing member 101 is so loaded as to be biased to the tape guide 33 under the elastic restoring force of the flexible member 56. The endless tape 31 travels while being held in place between the tape guide 33 and the tape pressing member 101 by a comparatively weak force of these members. The other points are the same as described with reference to the first embodiment.

In the endless tape cassette according to the second embodiment, the same advantages as in the first embodiment are obtained. In addition, the slackening of the endless tape 31 which would occur when the reel 21 is rotated in the reverse direction is suppressed within the cassette body 15, so that the slackening of the endless tape never occurs at the front of the tape cassette. More particularly, when the reel 21 is rotated in the reverse direction, i.e. in the direction of arrow B, the endless tape 31 becomes slackened as shown by a phantom line in FIG. 12 between the tape guide and the reel 21. The slackening of the endless tape 31, however, never takes place in the front opening 14 of the cassette body 15, because the endless tape 31 is held in place by the tape guide 33 and the tape pressing member 101, both of which have a comparatively weak force. By such arrangement, there is eliminated a risk that the endless tape 31 is broken when the endless tape cassette is set in or removed from a video tape recorder.

In the conventional tape cassette, a member for preventing the slackening of a tape has been separately provided. In the tape cassette of the second embodiment, the tape pressing member 101 serving as a slackening preventing means is attached to the flexible member 56. The manufacturing cost is thus reduced, and reliability of the tape cassette itself is improved.

What has been described has no limitative sense, but various changes and modifications based on the technical idea of the present invention may be made within the scope of claims appended. In the preceding embodiments, the attaching piece 61 is attached to the reverse rotation check lever 55, so as to connect the lever-driving, flexible member 56 thereto. A means for connecting these two members may be of any structure, so far as the reverse rotation check lever 55 and the flexible member 56 are connected to each other in a manner that the relative sliding movement is permitted. The preceding embodiments are described as realized as an endless tape cassette for use in a video tape recorder. The present invention is applicable to an endless tape cassette for use in a tape recorder.

What is claimed is:

1. A tape cassette comprising;

a cassette body consisting of an upper half case and a lower half case which are mated with each other, and having a front opening;

a front lid pivotally movably secured to said cassette body and adapted to assume an open position and a close position with respect to said front opening;

a tape drawing reel rotatably mounted in a portion displaced to one side from the center of said cassette body;

a tubular guide mounted in a portion displaced to the other side from the center of said cassette body in a line-synmetrical relation to said tape drawing reel with respect to the central axis of the cassette body;

a tape accumulating portion defined by a partition wall provided adjacent to said tubular guide in the other side position of said cassette body, and by said tape drawing reel;

a flexible, endless tape contained in a folded or meandering fashion in said tape accumulating portion;

a tape discharge gate provided midway of a tape passage leading from said tape accumulating portion to the exterior of said tape cassette body; and a pair of elastic strips elastically supported on said lower half case of said cassette body in an elastically contacting and opposing relation to each other, with free ends thereof facing said tape discharge gate, whereby said endless tape is caused to pass through the free ends of said pair of elastic strips.

2. A tape cassette as defined in claim 1, wherein a tubular cover for preventing the clinging of a tape is fitted on said tubular guide, said tubular cover being made of a sheet material having a small coefficient of friction, such as a high molecular film.

3. A tape cassette as defined in claim 1, wherein said tape discharge gate is provided by cutting off part of said partition wall.

4. A tape cassette as defined in claim 1, wherein a pair of elastic strips are attached to the cassette body by securing the base portions thereof to the outer peripheral portion of said tape accumulating portion, with the free ends thereof facing said tape discharge gate.

5. A tape cassette as defined in claim 1, wherein a tape holding piece made of a material having a small coefficient of friction, such as a super high molecular film is attached to the free end of each elastic strip.

6. A tape cassette as defined in claim 1, wherein the tape holding piece covers more than half the overall length of each elastic strip.

7. A tape cassette as defined in claim 1, wherein said pair of elastic strips respectively have a cut provided at the lower longitudinal edge thereof, and are attached to the cassette body by receiving a positioning pin projecting from the lower half case in said cut and fitting said cut into a pair of support pins upright on the lower half case of said cassette body.

8. A tape cassette as defined in claim 1, wherein said pair of elastic strips are held in place by pins projected from the top inner wall of the upper half case to be mated with the lower half case, whereby a position relative to the direction of thickness of the cassette body, of said pair of elastic strips is regulated.

9. A tape cassette as defined in claim 4, wherein respective elastic strips have a different length, so that the free end of one elastic strip located inward of the cassette body projects toward the tape accumulating portion, as compared with the free end of the other elastic strip located outward of the cassette body.

10. A tape cassette as defined in claim 4, wherein respective elastic strips have a different length, so that the free end of the other elastic strip located outward of the cassette body projects toward the tape accumulating portion, as compared with the free end of said one elastic strip.

11. A tape cassette as defined in claim 4, wherein said pair of elastic strips respectively have a tape holding piece at the free end thereof, and the tape holding piece attached to said other elastic strip located outward of the cassette body projects toward the tape accumulating portion and is tilted toward the inner part of said cassette body, as compared with the tape holding piece attached to said one elastic strip located inward of said cassette body.

12. A tape cassette comprising;
- a cassette body consisting of an upper half case and a lower half case, which are mated with each other, and having a front opening;
- a front lid pivotally movably secured to said cassette body to assume an open position and a close position with respect to said front opening;
- a tape drawing reel rotatably mounted in said cassette body in a portion displaced to one side from the center of said cassette body and having an elastic member which covers the over-all tubular peripheral surface thereof;
- a reverse rotation check member attached to said cassette body pivotally movably about a support shaft;
- a flexible member secured at one end or in the intermediate portion thereof to said cassette body and curved from the point, at which the flexible member is secured, to the other end thereof, the other end of said flexible member being maintained in pressure-contact with the peripheral surface of the elastic member covering the flank portion of said reel, and said flexible member being slidably connected to said reverse rotation check member, in a portion between said fixed portion and said other end thereof;
- a tubular guide disposed in a portion displaced to the other side of said cassette body in a line-synmetrical relation to said tape drawing reel with respect to the central axis of the cassette body;
- a tape accumulating portion defined by said tape drawing reel and a partition wall extending in a portion nearer to the other side of said cassette body and provided with a tape outlet; and
- a flexible, endless tape contained in a folded or meandering fashion in said tape accumulating portion.

13. A tape cassette as defined in claim 12, wherein there are provided a tape press member having elasticity, and a separation member having elasticity, said tape press member being adapted to press part of said endless tape against the peripheral surface of the elastic member covering the flank portion of said tape drawing reel, and said separation member being adapted to press the peripheral surface of said elastic member in an opposing relation to said press member.

14. A tape cassette as defined in claim 12, wherein said reverse rotation check lever is made of an elongated plate and supported at one end thereof pivotally movably about a support shaft upright on the cassette body, said check lever being bent at an acute angle at the other end.

15. A tape cassette as defined in claim 12, wherein said lever-driving, flexible member is attached to the cassette body by fitting a positioning cut at the lower longitudinal edge into a support portion provided on said lower half case and fitting one end of said flexible member into a recess in said support portion, and said flexible member is held in place by a projection pendent from the top inner wall of the upper half case.

16. A tape cassette as defined in claim 12, wherein the bent end portion of said reverse rotation check lever and the elastic member covering the flank portion of said tape drawing reel are separated from each other when said tape drawing reel is rotated in the reverse direction or rotation of said reel is stopped.

17. A tape cassette as defined in claim 12, wherein one end of said lever-driving, flexible member is increased in length; and a tape holding piece is attached to said one end with an increased length, thereby pressing the endless tape against the tape guide provided in the cassette body.

18. A tape cassette as defined in claim 17, wherein said tape holding piece is made of a low frictional material having a small coefficient of friction.

19. A tape cassette as defined in claim 17, wherein said tape holding piece is made of a super high molecular film containing carbon.

* * * * *